E. L. LINAY.
DEVICE OR APPLIANCE FOR USE IN TEACHING CHILDREN.
APPLICATION FILED JULY 10, 1918.
1,294,126.
Patented Feb. 11, 1919.
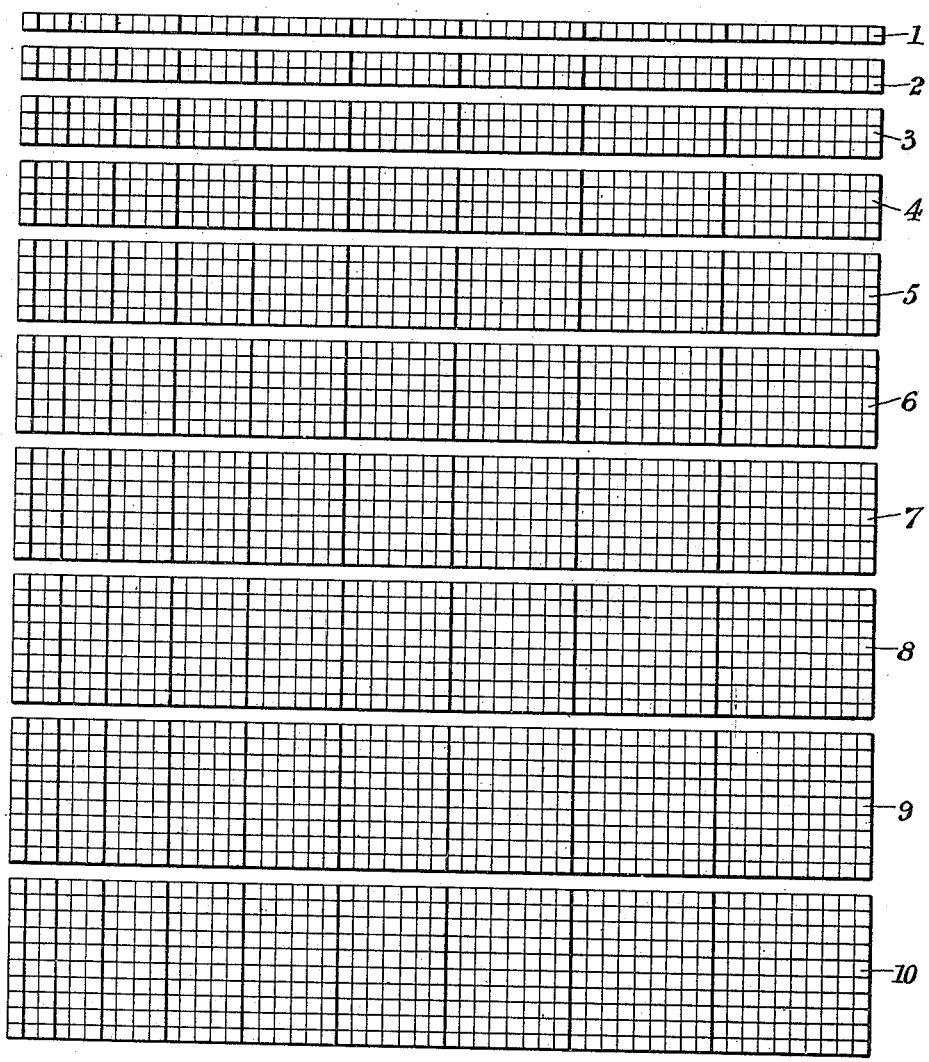
INVENTOR
ETHEL LOUISE LINAY
BY Howson and Howson
ATTORNEYS

UNITED STATES PATENT OFFICE.

ETHEL LOUISE LINAY, OF READING, ENGLAND.

DEVICE OR APPLIANCE FOR USE IN TEACHING CHILDREN.

1,294,126.   Specification of Letters Patent.   Patented Feb. 11, 1919.

Original application filed April 18, 1918, Serial No. 229,361. Divided and this application filed July 10, 1918. Serial No. 244,278.

*To all whom it may concern:*

Be it known that I, ETHEL LOUISE LINAY, a subject of the King of Great Britain, residing at 14 Christchurch road, Reading, in the county of Berks, England, have invented new and useful Improvements in Devices or Appliances for Use in Teaching Children, of which the following is a specification.

My invention consists in an improved device, or appliance, for use (in accordance, for instance, with systems such as that known as the Montessori system) in teaching children, especially such subjects as addition, subtraction, multiplication, division, the measurement of areas, proportions, calculations, and the like and to assist them to realize that a number is simply a proportion of that number to unity.

The present application is a division of my co-pending application Serial No. 229,361, filed April 18, 1918.

The device, or appliance, in accordance with my invention consists of a board constituted by longitudinal strips of different, and increasing, widths, these strips being divided, by lines, or by cuts, (which may extend right through the strips) into spaces, or pieces, which are of increasing area, they being marked with divisions all of the same area, but increasing in number to denote increasing values.

The accompanying drawing shows, in plan, a series of strips to constitute a board in accordance with my invention, the said strips being shown separated a short distance from each other to illustrate them more distinctly. The strips are marked 1 to 10, (inclusive), the board, as a whole, which is constituted by the strips, being divided into squares of equal area the thin lines being ruled, as shown, horizontally and vertically to form these squares over the whole surface. Heavy, or other distinguishing, lines are marked, as shown vertically, so as to divide the squares into series from 1 to 10. The strips increase in arithmetical series from a row of single spaces (the strip 1) to ten rows of spaces (the strip 10).

The said divided board when out of use may be placed in a box of the same length as that of the strips and of a width equal to that of the widest strip (10), plus the thickness of the strips and of a depth equal to the thickness of five of the strips when the strips can all be compactly arranged in the box by placing the strip 10 in the bottom of the box, the strips 9 and 1 on that, the strips 8 and 2 upon those, and the strips 7 and 3 upon those, the strips 6 and 4 being placed upon all to form the top layer, and the strip 5 being placed vertically in the space therefor which will be left at the front, or back, of the box.

More especially for teaching elementary mathematics, such as products and the like, the device made in strips of progressively increasing widths as aforesaid and illustrated may be divided also transversely, along where the heavy lines are marked on the drawing, so as to form pieces, increasing in width horizontally from 1 to 10. The said pieces, will each represent a different number made by the multiplication table up to ten times ten, such numbers being represented by the number of squares into which the pieces, are divided. The box for containing these pieces when out of use, may be like that for the strips not separated into pieces.

What I claim is:—

1. A device, or appliance, for use in teaching children, the said device, or appliance consisting of a board constituted by longitudinal strips of different and increasing widths, these strips being divided by transverse lines into spaces which are of increasing area and which are marked with divisions all of the same area, but increasing in number to denote increasing values.

2. A device, or appliance, for use in teaching children, the said device, or appliance, consisting of a board constituted by longitudinal strips of different and increasing widths, these strips being divided transversely into pieces which are of increasing area and which are marked with divisions all of the same area, but increasing in number to denote increasing values.

In testimony whereof I have signed my name to this specification in the presence of two subscribing witnesses.

ETHEL LOUISE LINAY.

Witnesses:
 FRED. W. NEWTON,
 MARJORIE CREERY HILL.

Copies of this patent may be obtained for five cents each, by addressing the "Commissioner of Patents, Washington, D. C."